United States Patent

Ejiri et al.

[11] Patent Number: 6,104,840
[45] Date of Patent: *Aug. 15, 2000

[54] METHOD AND SYSTEM FOR GENERATING A COMPOSITE IMAGE FROM PARTIALLY OVERLAPPING ADJACENT IMAGES TAKEN ALONG A PLURALITY OF AXES

[75] Inventors: Koichi Ejiri, Narashino; Haike Guan; Shin Aoki, both of Kanagawa, all of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/966,889

[22] Filed: Nov. 10, 1997

[30] Foreign Application Priority Data

Nov. 8, 1996 [JP] Japan ................................. 8-296025
Jun. 24, 1997 [JP] Japan ................................. 9-166737

[51] Int. Cl.⁷ ........................................... G06K 9/36

[52] U.S. Cl. ................................. 382/284; 382/294

[58] Field of Search ............................ 382/284, 294; 345/113, 433; 395/135; 359/29, 557; 348/36, 39

[56] References Cited

U.S. PATENT DOCUMENTS

| | | | |
|---|---|---|---|
| 4,895,431 | 1/1990 | Tsujiuchi et al. | 359/29 |
| 5,463,729 | 10/1995 | Kitaguchi et al. | 345/433 |
| 5,513,300 | 4/1996 | Shibazaki | 395/135 |
| 5,611,033 | 3/1997 | Pitteloud et al. | 395/135 |
| 5,732,230 | 3/1998 | Cullen et al. | 395/135 |
| 5,848,201 | 12/1998 | Kajiwara | 345/113 |

FOREIGN PATENT DOCUMENTS 8-273294  10/1996  Japan .

OTHER PUBLICATIONS

Shenchang Eric Chen, Apple Computer, Inc., Quick–Time VR—An Image–Based Approach to Virtual Environment Navigation, 1995.

*Primary Examiner*—Yon J. Couso
*Attorney, Agent, or Firm*—Knoble & Yoshida LLC

[57] ABSTRACT

A composite image is generated from partially overlapping adjacent images taken at a single location along a plurality of axes. The angular relation among the overlapping images is initially determined based upon a common pattern in an overlapping portion of the images. The overlapping images are each converted to with respect to one of the images selected as a standard image based upon the previously determined angular relation.

23 Claims, 7 Drawing Sheets

FIG. 4

|  | ANGULAR EXPRESSION | COORDINATE EXPRESSION |
|---|---|---|
| S1 |  | CONVERTING TO COORDINATES IN REAL NUMBER |
| S2 |  | EXTRACTING A COMMON PATTERN |
| S3 | CONVERTING TO ANGLE $\theta'$ |  |
| S4 | APPROXIMATING CORRECTIVE COEFFICIENTS A & B FOR DISTORTION AFFERATION |  |
| S5 | DETERMINING CORRECTED $\theta$ |  |
| S6 | CONVERTING COORDINATES |  |
| S7 | DETERMINING A COORDINATE CONVERSION MATRIX |  |
| S8 | COORDINATE CONVERSION |  |
| S9 |  | PROJECTING TO A DISPLAY SURFACE |
| S10 |  | CONVERTING TO UNIFORM PIXEL DISTANCE |

METHOD AND SYSTEM FOR GENERATING A COMPOSITE IMAGE FROM PARTIALLY OVERLAPPING ADJACENT IMAGES TAKEN ALONG A PLURALITY OF AXES

RELATED APPLICATION DATA

This application is related to pending U.S. patent application Ser. No. 08/807,571, filed Feb. 27, 1997 for A METHOD AND A SYSTEM FOR CORRECTING DISTORTED ABERRATIONS IN HIGH-RESOLUTION IMAGES

FIELD OF THE INVENTION

The current invention is generally related to generation of a composite image, and more particularly related to the composite image generated from partially overlapping adjacent images taken at a single location along a plurality of axes.

BACKGROUND OF THE INVENTION

In general, to generate a composite image, a plurality of partially overlapping images is taken by rotating an image capturing device along certain axes. These separate images are later placed together to form a composite image. Even though overlapping regions are carefully placed together, the composite image often lacks the naturally continuous appearance. To illustrate the above problem, referring to FIG. 1A, a digital camera d is positioned at a predetermined location and is rotated along a first axis which is parallel to a z axis so as to take images a and b. Then, still at the same location, the digital camera d is now rotated along a x axis to take an image c. The corresponding filming ranges or areas are shown in the respective boundaries. The images a, b and c are projected onto a corresponding image plane a', b' or c'. Referring to FIG. 1B, when the above described images on the image plane a', b' and c' are placed together, certain portions of the images are distorted from the original image as shown in FIG. 1A.

Referring to FIG. 2, the above described problem is caused by the following reasons. An image capturing device such as a digital camera d captures an image of an object 3. The camera d is rotated to a position d' along a common axis. As a result of rotation, a lens at a first position 1 is moved to a second position 1' while an image capturing plane such as a charge coupled device (CCD) is rotated to a position 2'. A portion bc of the object 3 is captured as an image P1P2 on the CCD 2. After the camera is rotated to the position d', the same image portion bc is now captured as an image qr on the CCD at the position 2'. Even if no distortion is assumed for the lens, because of the different angles of the CCD 2 with respect to the object 3, the same image portion bc is formed with a different length.

Composite pictures are often created when an image is too large for a single image-carrying medium. For example, a panoramic view of astronomical images is generated from a series of individual images covering a partial view. Since a relative angle of each of the individual images can be determined, it is possible to correct the individual images based upon the relative angle. However, it is not always the case that the relative angle of the individual image is available.

SUMMARY OF THE INVENTION

In order to solve the above and other described problems, according to a first aspect of the current invention, a method of generating a composite image from a plurality of partially overlapping images, includes the steps of: a) taking the partially overlapping images from a common location along a plurality of axes, the partially overlapping images including a first image portion and a second image portion, the first image portion and the second image portion sharing at least a common pattern; b) determining an angular relation between the first image portion and the second image portion based upon the common pattern; and c) generating the composite image from the first image portion and the second image portion.

According to a second aspect of the current invention, a system for generating a composite image from a plurality of partially overlapping images, includes: an image input unit for taking the partially overlapping images at a common location but along a plurality of axes, the partially overlapping images including a first image portion and a second image portion, the first image portion and the second image portion sharing at least a common pattern; and a processing unit connected to the image input unit for determining an angular relation between the first image portion and the second image portion based upon the common pattern and for generating the composite image from the first image portion and the second image portion.

According to a third aspect of the current invention, a portable image processing device for generating a composite image, includes: an image input unit for taking a plurality of partially overlapping adjacent images at a fixed location along a plurality of axes; an angular position sensor connected to the image input unit for determining an angular position of the image input unit for each of the partially overlapping adjacent images; and a processing unit connected to the image input unit and the angular position sensor for generating a composite image from the partially overlapping adjacent images based upon the angular position.

According to a fourth aspect of the current invention, a program storage device readable by a machine, tangibly embodying a program of instructions executable by the machine to perform method steps of generating a composite image, the method steps includes: a) taking partially overlapping images from a common location along a plurality of axes, the partially overlapping images including a first image portion and a second image portion, the first image portion and the second image portion sharing at least a common pattern;

b) determining an angular relation between the first image portion and the second image portion based upon the common pattern; and c) generating the composite image from the first image portion and the second image portion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 illustrates basic steps of one preferred method to practice the current invention.

DETAILED DESCRIPTION OF THE PREFERRED EMBODIMENT(S)

Figure 1A:
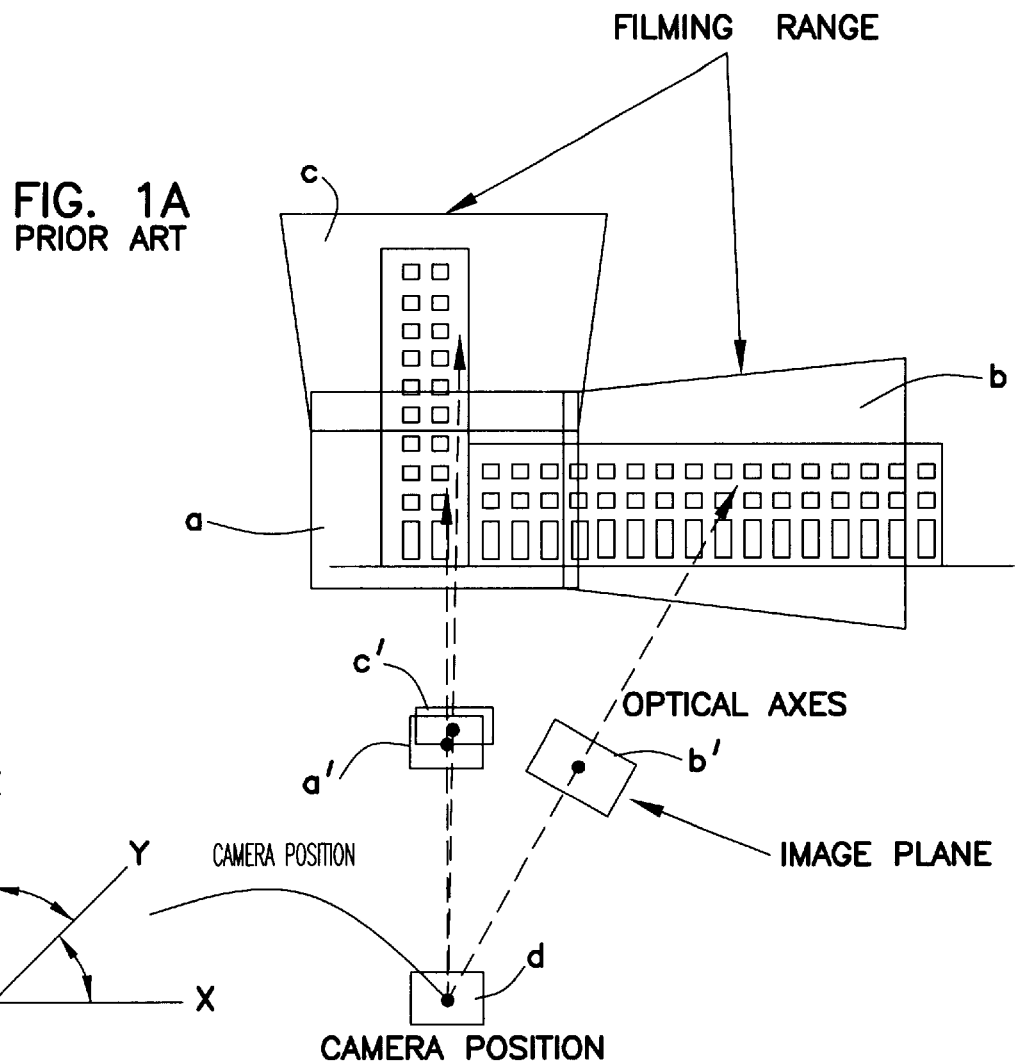
FIGS. 1A and 1B illustrate a prior art problem of a composite picture or image generated from a plurality of partially overlapping images that are taken at a single location by rotating an image-capturing device along a plurality of axes.
Figure 1B:
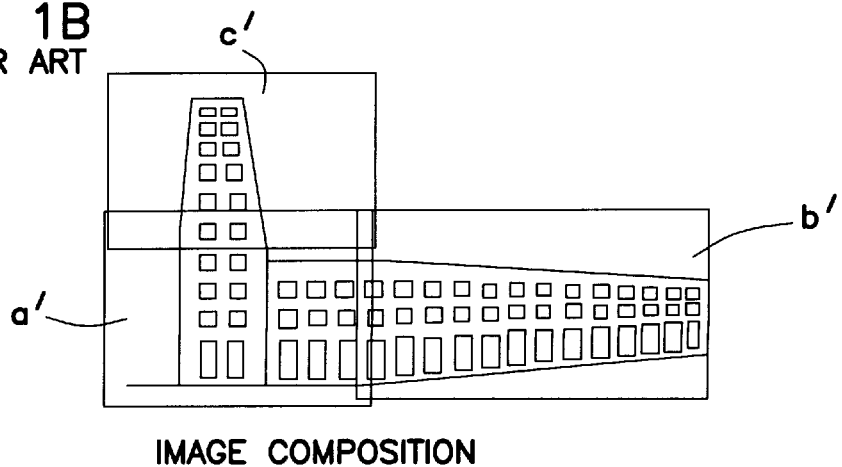
Figure 2:
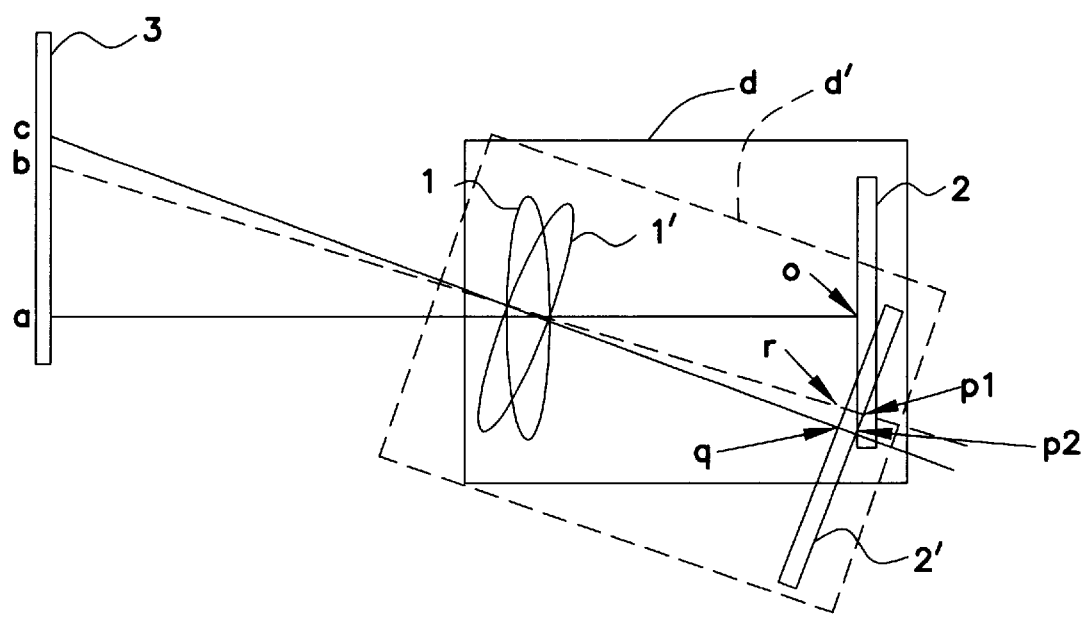
FIG. 2 illustrates a prior art problem in a cross sectional view of an object and an image-capturing device for capturing the object image when the image-capturing device is rotated.
Figure 3:
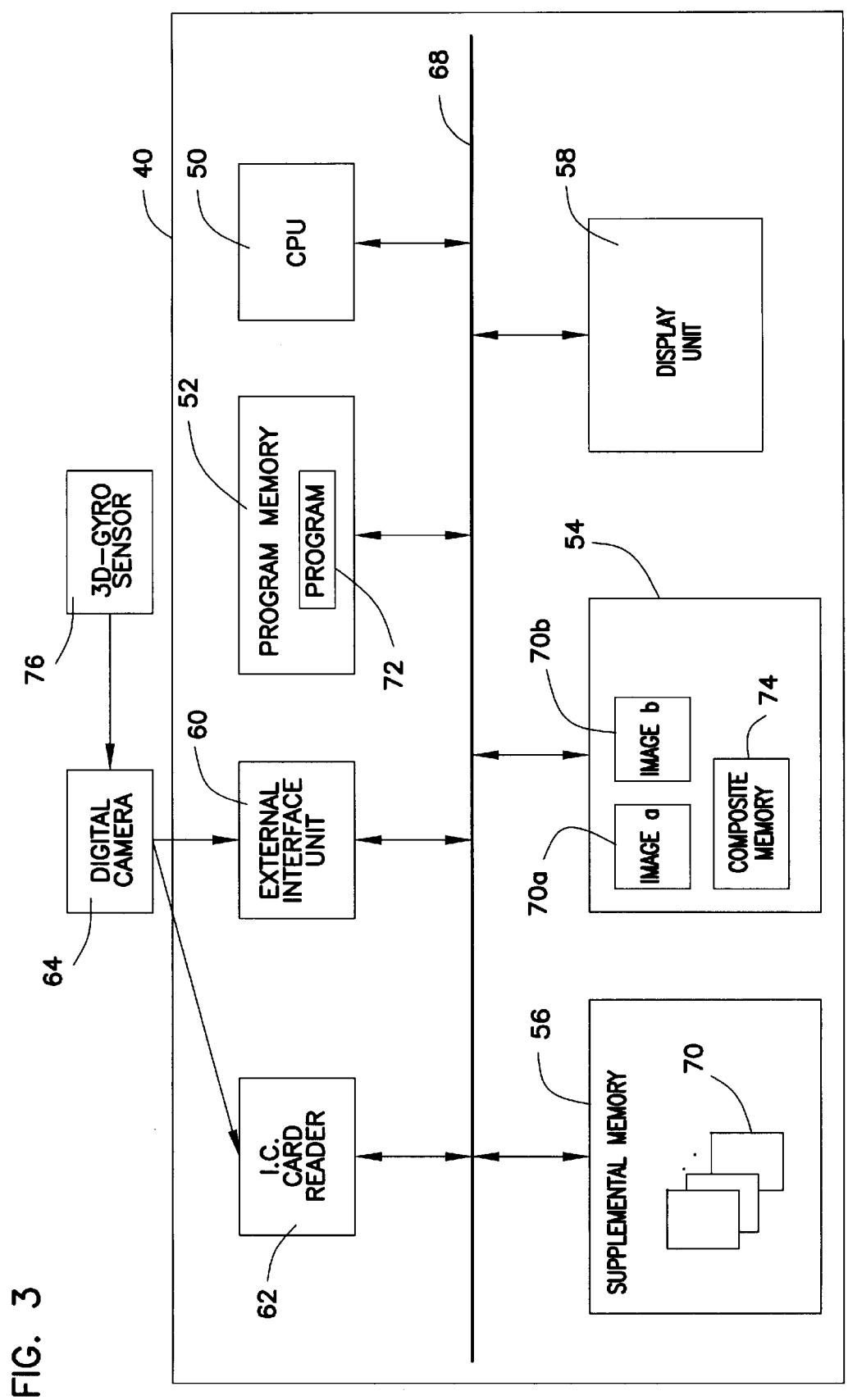
FIG. 3 is a block diagram illustrating one preferred embodiment of the composite image generating system according to the current invention.

Referring now to the drawings, wherein like reference numerals designate corresponding structure throughout the views, and referring in particular to FIG. 3, one preferred embodiment of the image composition system according to the current invention is illustrated in a block diagram. One preferred embodiment includes a digital camera 64 for taking a series of images along a plurality of axes. The digital camera 64 is optionally equipped with a 3D-gyro sensor 76 and receives an input signal indicative of the camera's angular position from the 3D-gyro sensor 76. A processing unit 40 includes an IC card reader 62, an external interface unit 60, a program memory 52, a central processing unit (CPU) 50, a display unit 58, a data memory unit 54, and a memory storage unit 56, and these components are connected by a system bus 68. The digital camera 64 is connected to the external interface unit 60 so as to transfer data representative of the images. In the alternative, the digital camera 64 includes a removable memory card for storing the image data, and the memory card is placed into the IC card reader 62 to transfer the image data.

Still referring to FIG. 3, data 70 representative of a plurality of the above described partially overlapping images is inputted in a storage unit 56 such as a disk drive. The data 70 also includes additional information such as a distance between a lens and an image-forming plane and a continuity characteristics for each of the partially overlapping images. The partially overlapping image data 70 such as Image a and Image b is read from the storage unit and is temporary stored in a respective sub-memory unit 70a and 70b in a data memory unit 54. Software 72 is also stored in the storage unit 56 and is read into a program memory unit 52. The CPU 50 processes the image data in the data memory unit 54 according to the software 72 to determine an angular or coordinate relation among the partially overlapping images. In particular, the angular relation is determined based upon a common pattern existing between two partially overlapping images. Based upon the angular relation, the software 72 and the CPU 50 convert the coordinates of one partial image into those of a standard image coordinate system. After all of the images are processed, a composite image is generated in a composite memory unit 74. A display unit 58 displays the composite image.

Referring to FIG. 4, a sequence of processing steps is generally summarized in a table format. In a step 1, integer coordinates are converted into real number coordinates. Assuming that images are rendered on an image-capturing or photo sensor surface such as a CCD device, a photosensitive elements are generally arranged at a uniform pitch $x_0$ and $y_0$ in respective x and y directions whose origin is an intersection between an optical axis and the image-capturing surface. Each pixel or photo-sensitive element is identified by (i, j) where i and j are both integers. To increase the accuracy of a composite image forming method, the integer coordinates (i, j) are converted into the real number coordinates ($i_x$, $j_y$) where $i_x = i \cdot x_0$, $j_y = j \cdot y_0$.

In a step 2, in order to determine an angular relation between the images taken at different angles from the same location, a plurality of pairs of common patterns or common partial images is used between two adjacent images. After a common pattern of one image is searched in a comparable size block of another image to determine the common pattern, certain representative coordinates from each of the two images are stored. The representative coordinates include a center of the partial image.

In a step S3, assuming an angle of incidence θ of light and an exiting angle θ' with respect to an optical axis. The exiting angle θ' is determined by the following equation (1):

$$\theta' = \arctan\left(\sqrt{ix^2 + jy^2} \Big/ R\right) \tag{1}$$

where R is a distance between the center of a lens and an image-capturing surface (CCD). To determine an amount of distortion aberration, the following equation (3) is substituted into the equation (2). The equation (2) is a conversion function while the equation (3) is a distortion aberration function.

$$\theta' = \theta f(\theta) \tag{2}$$

As a result of the substitution, the following equation (4) is obtained.

$$f(\theta) = 1 - A\theta^2 + B\theta^4 \tag{3}$$

$$\theta' = \theta - A\theta^3 + B\theta^5 \tag{4}$$

In a step 4, corrective distortion aberration coefficients A and B are approximated. The detailed of the approximation step 4 is non-essential to the current invention and hereby incorporated by external reference to Japanese Patent Application Serial Number 8-273294. The approximation step involves repetitive sub-steps of incrementing the value of the coefficient A from an initial value A0 by ΔA. After setting one pair of the coordinates θi', θj' representing a point in the common pattern and another pair of the coordinates θi", θj" representing a corresponding point, each of these angular coordinates is substituted in θ' of the above equation (4) for determining θ as the coefficient A is increased. The corresponding θ values are denoted by θio', θjo', θio", and θjo" and A is determined as the error in the following equation is converged.

$$E = \sum_{i,j} \{(\theta'_{io} - \theta'_{jo})^2 - (\theta''_{io} - \theta''_{jo})^2\}^2 \tag{5}$$

By the same token, the coefficient B is determined by incrementing from an initial value B0 by ΔB. Another point in the common pattern is selected for substituting into the above equation (4), and B is determined as the error in the above equation (5) is converged.

In a step 5, based upon the corrective distortion aberration coefficients A and B approximated by the above step 4, the above equation (2) is solved for the corrected angle θ for each pixel in an image. In a step (6), the corrected angle θ is now converted into a directional angular coordinate, that is longitude and latitude using the following equations:

$$\phi_x = \arctan\left(\tan(\theta) \cdot \frac{i_x}{\sqrt{i_x^2 + j_y^2}}\right) \quad (6)$$

$$\phi_y = \arctan\left(\tan(\theta) \cdot \cos(\phi_x) \cdot \frac{j_y}{\sqrt{i_x^2 + j_y^2}}\right) \quad (7)$$

The directional angular coordinates determined by the above equations (6) and (7) are unique to each of the images. Although the distortion aberration has been corrected, the angular coordinates do not yet share a common coordinate system.

In a step 7, in order to unify the angular coordinate system among image blocks or partially overlapping images, a coordinate conversion matrix A is determined for converting coordinates in one coordinate system into those in another coordinate system. In a step 8, based upon the coordinate conversion matrix A, the coordinates of a first image location in one image under its coordinate system is converted into a corresponding location under a selected coordinate system as if the first image location is seen under the selected coordinate system. After the step 8, the coordinates of the two images containing the common pattern are now expressed under the same coordinate system. However, since some pixels under the unified coordinate system do not squarely fall on the coordinates which have pixel values, in order to render a composite image, these newly converted pixels must be assigned with pixel values based upon surrounding pixel values.

In a step 9, the composite image existing in a memory space is now projected onto a display surface. In general, since the display surface is substantially flat, the display coordinates (u, v) are determined by the following equation:

$$u = \tan(\phi x/R), v = \tan(\phi y/R)$$

where φx and φy are respectively defined in the above equations (6) and (7) while R is a distance between an image-capturing device and the center of a lens. Since the composite image as generated in the step 8 does not have a completely uniform pitch between the coordinates, in a step 10, the coordinates in the composite image are converted into a uniform pixel distance or pitch of a display surface by linear correction.

Figure 5:
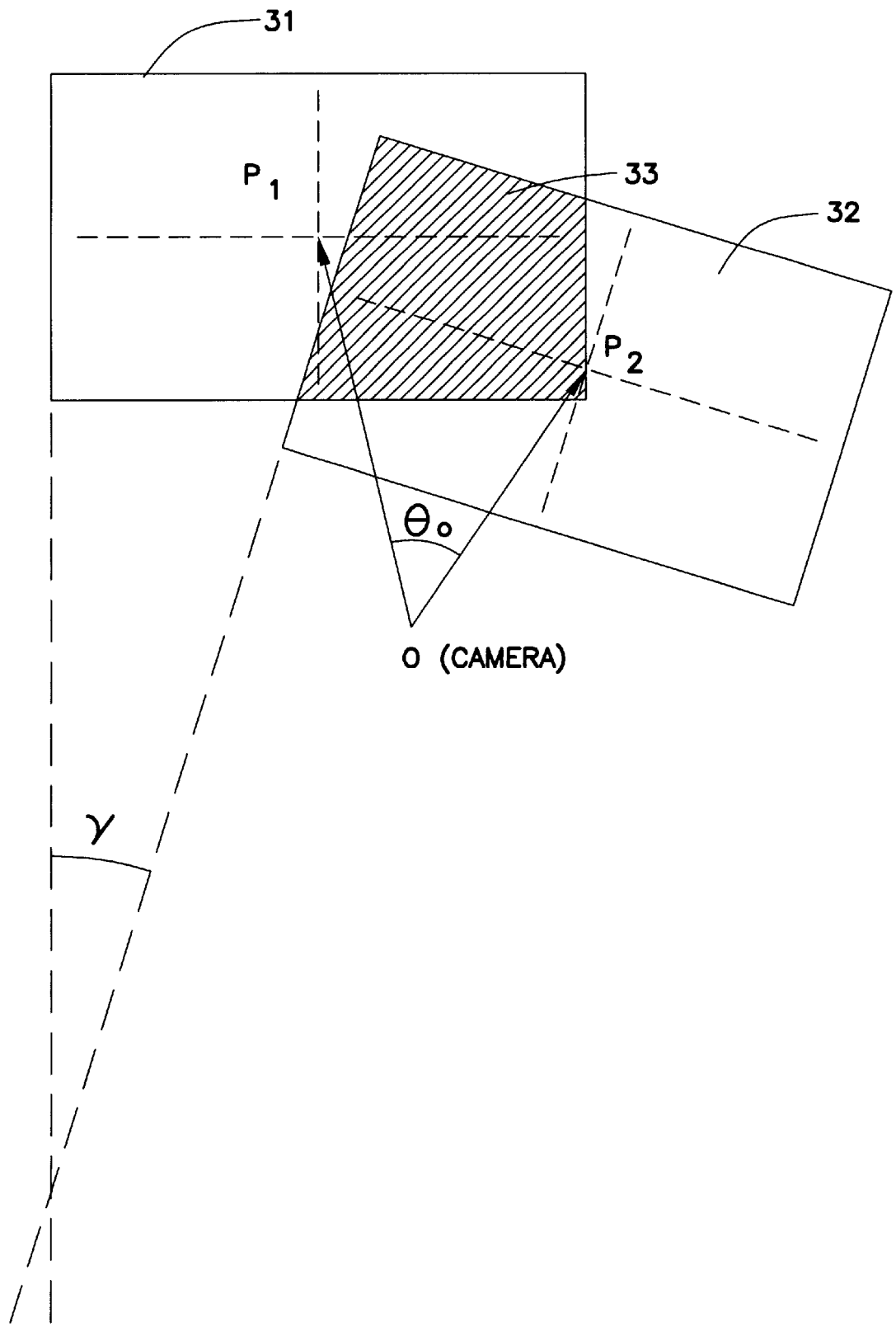
FIG. 5 illustrates a common pattern in a two-dimensional view for determining an angular relation between two images.

Referring to FIG. 5, in order to describe certain steps for converting coordinates of one system to those of another, two images 31 and 32 share an overlapping portion 33. Assuming that an object of the image is located at infinity and the center of the camera lens O is at the same location, an angle θ₀ represents an angle formed between the centers P1 and P2 of the respective images 31 and 32 and the center O. An angle γ represents an amount of rotation of the two images 31 and 32. An object in each of the two images 31 and 32 is expressed in directional angular coordinates including latitude and longitude which are unique to each image. Although the object image 33 is a common pattern between the two images 31 and 32, in the image 31, the object image 33 has coordinates according to a first coordinate system of the image 31. On the other hand, in the image 32, the object image 33 has coordinates according to a second coordinate system of the image 32. In other words, the common pattern 33 has two sets of angular coordinates. Since the same common object is captured in the two images, the common image is expressed in a unified coordinate system by converting the coordinates of the first coordinate system into those of the second coordinate system.

Figure 6:
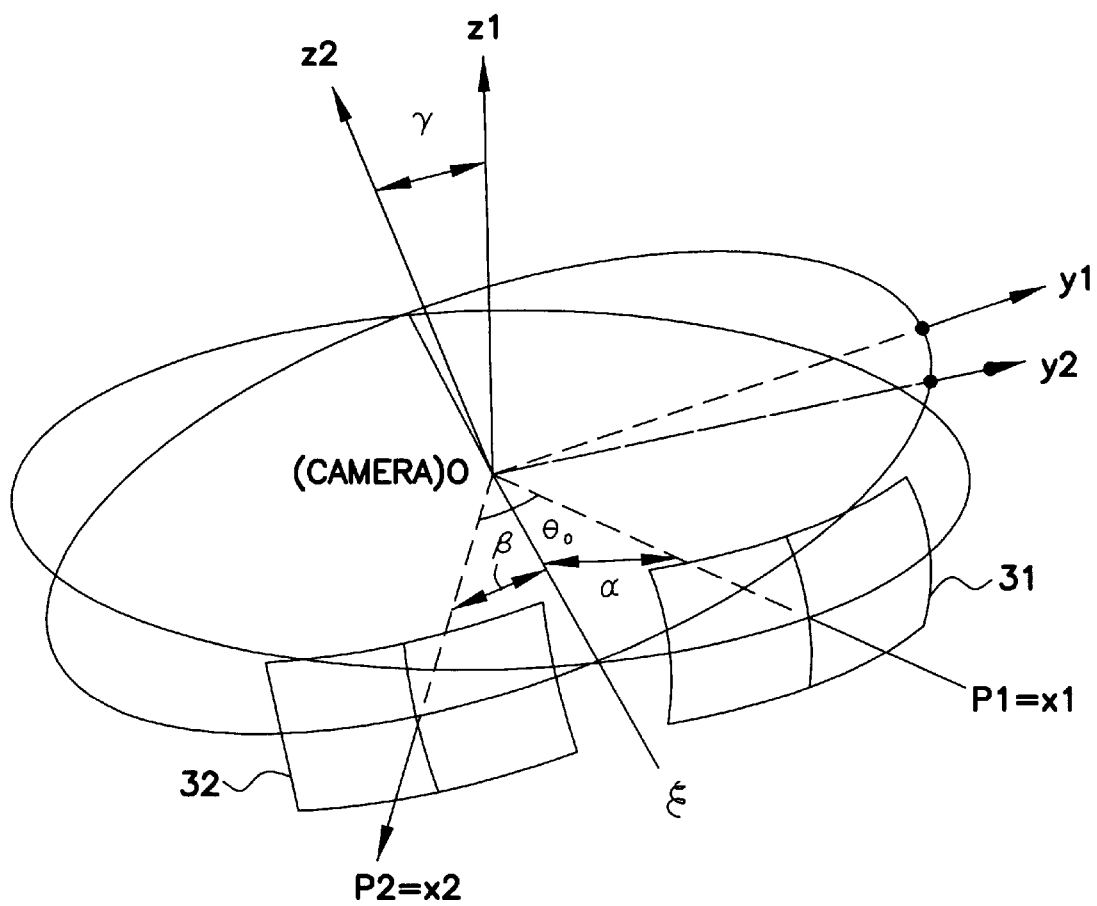
FIG. 6 illustrates a three-dimensional view of the two images for determining an angular relation between the two images.

In order to derive the conversion of the above described coordinates, referring to FIG. 6, two images 31 and 32 are illustrated in three-dimension. The two images 31 and 32 are separated apart to avoid any overlapping portion for simplicity. The coordinate system of the image 31 consists of x1, y1 and z1 axes, and any point in this coordinate system is expressed by (x1, y1, z1). Similarly, the coordinate system of the image 32 consists of x2, y2 and z2 axes, and any point in this coordinate system is expressed by (x2, y2, z2). The x1 and x2 axes coincide the respective centers P1 and P2 of the images 31 and 32. The origin of the two coordinate systems coincide, and an image-capturing device such as a digital camera is placed at the origin. The x1y1 plane and the x2y2 plane share a common axis ξ. An angle α is an angle between the common axis ξ and the x1 axis while an angle β is an angle between the common axis ξ and the x2 axis. An angle γ is an angle between the z1 and z2 axes and represents a tilt of the images. When the coordinate system (x1, y1, z1) is selected as a standard coordinate system for another coordinate system such as the coordinate system (x2, y2, z2), another coordinate system is converted into the standard coordinate system by the following equation (8):

$$(X1, Y1, Z1)^t = \quad (8)$$

$$\begin{bmatrix} \cos(\alpha)\cos(\beta) - \sin(\alpha)\sin(\beta)\cos(\gamma) & \cos(\alpha)\sin(\beta) + \sin(\alpha)\cos(\beta)\cos(\gamma) & -\sin(\alpha)\sin(\gamma) \\ -\sin(\alpha)\cos(\beta) - \cos(\alpha)\sin(\beta)\cos(\gamma) & -\sin(\alpha)\sin(\beta) + \cos(\alpha)\cos(\beta)\cos(\gamma) & -\cos(\alpha)\sin(\gamma) \\ \sin(\beta)\sin(\gamma) & \cos(\beta)\sin(\gamma) & \cos(\gamma) \end{bmatrix} \times$$

$$(x2, y2, z2)^T$$

The direction cosines of the x1y1z1 coordinate system are represented by (L, M, N) while those of the x2y2z2 coordinate system are represented by (l, m, n). When the conversion matrix of the above equation (8) is expressed by A, the following equation (9) also holds:

$$(L, M, N)^T = A(l, m, n)^T \quad (9)$$

where l=cos(φy) cos(φx), m=cox(φy) sin(φx), n=sin(φy) and l=cos(ψy) cos(ψx), M=cox(ψy) sin(ψx), N=sin(ψy). φx and φy are a longitude and a latitude of an image 31 and 32 as determined in the step 6 of the above described process as illustrated in FIG. 4. Thus, the above equation (9) is now rewritten in the following equation (10):

$$\begin{pmatrix} \cos(\phi y)\cos(\phi x) \\ \cos(\phi y)\sin(\phi x) \\ \sin(\phi y) \end{pmatrix} = A \begin{pmatrix} \cos(\phi y)\cos(\phi x) \\ \cos(\phi y)\sin(\phi x) \\ \sin(\phi y) \end{pmatrix} \quad (10)$$

Although the common pattern shared by the two images 31 and 32 has two sets of coordinates with respect to the two images, the common pattern should have a single coordinate set. To determine the single coordinate set, by solving the following equation (11) for a set of J representative points of the common pattern, the angles α,β and γ are determined, and the conversion matrix A is thus determined.

$$\sum_j \left\| \begin{pmatrix} \cos(\phi y)\cos(\phi x) \\ \cos(\phi y)\sin(\phi x) \\ \sin(\phi y) \end{pmatrix} - A \begin{pmatrix} \cos(\phi y)\cos(\phi x) \\ \cos(\phi y)\sin(\phi x) \\ \sin(\phi y) \end{pmatrix} \right\|^2 \quad (11)$$

Figure 7:
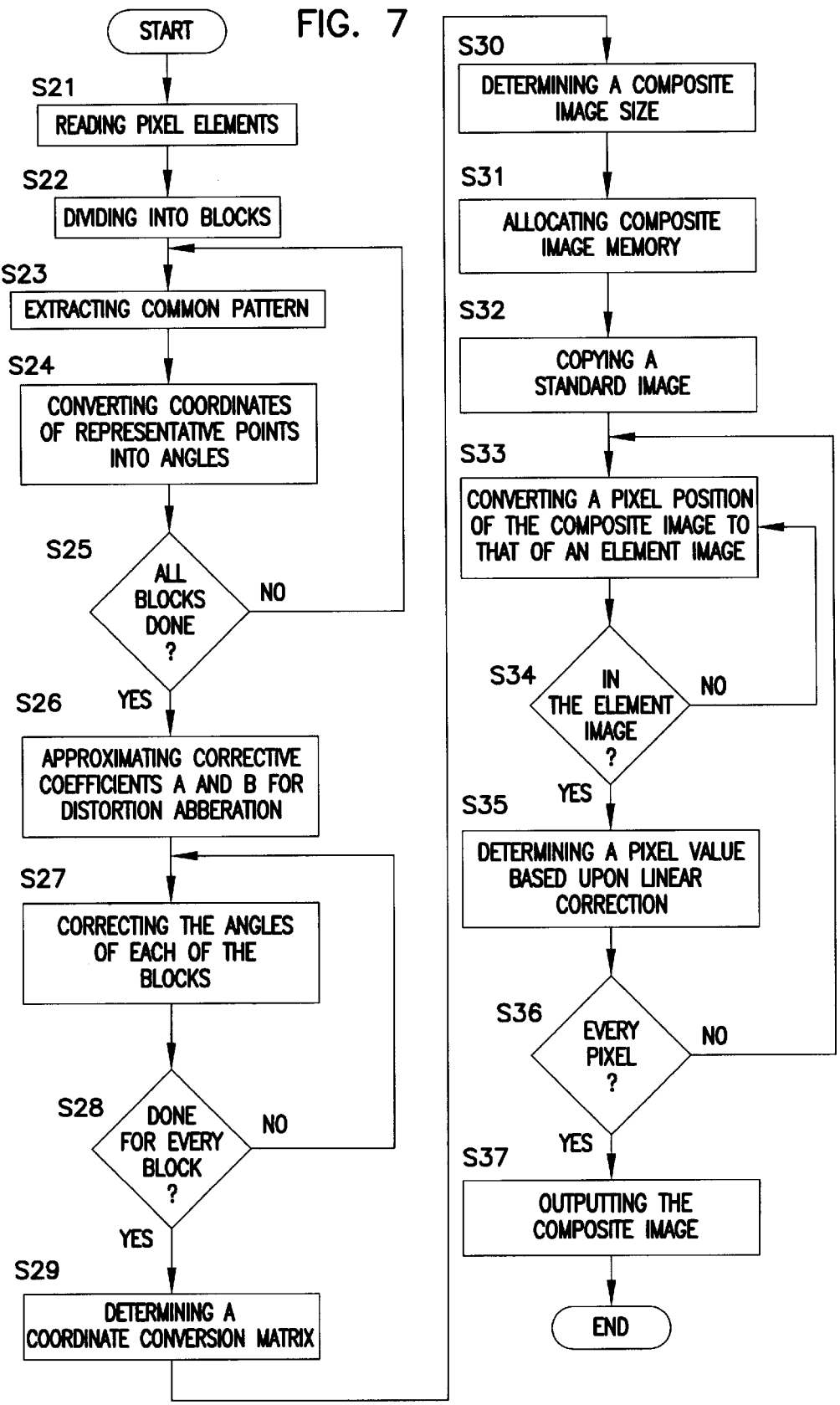
FIG. 7 is a flow chart illustrating steps performed by one preferred process according to the current invention.

Now referring to FIG. 7, the overall flow of one preferred process according to the current invention is illustrated in a flow chart. In a step 21, pixel element data representing at least two partially overlapping images is read in a data memory unit from a storage unit. One of these images is selected as a standard image. In a step 22, each of the images is divided into blocks of a predetermined size such as 16 by 16 pixels. In a step 23, a common pattern in the two adjacent images is identified if a certain similarity threshold is met. In a step 24, selected representative point coordinates in a common pattern are converted into angular coordinates based upon the above described equation (1). The angular coordinates are temporarily stored in a data memory unit. The above described steps 23 and 24 are repeated for every block until all the blocks are completed as checked in a step 25. When all the blocks are processed so that the common pattern representative coordinates are converted into angular coordinates, the corrective coefficients A and B for distortion aberration are approximated based upon the above described equations (1) through (5). In a step 27, based upon the above described equations (6) and (7), the angular coordinates are corrected to substantially eliminate the distortion aberration. The correction step 27 is performed for every block as checked by a step 28. After all the blocks are processed for the distortion aberration correction, in a step 29 a conversion matrix A is determined for converting the coordinates from one system to another. In general, the above described steps 21 through 29 collectively correspond to steps 1 through 7 of FIG. 4.

Still referring to FIG. 7, in a step 30, the size of a composite image is determined based upon the projection of the converted coordinates onto a composite image surface. The composite image size covers at least both of the projected images. In a step 31, a composite image memory is allocated for composite image pixel values according to the above determined composite image size. The pixel values may be initialized to for example either black or white. In a step 32, pixel values of the standard image whose coordinate system is used as a reference or standard for the conversion are copied into a part of the allocated memory. In a step 33, according to one preferred method step, a composite image coordinate system is identical to the standard coordinate system, and one composite coordinate is converted to the non-standard image coordinate based upon the conversion matrix A which has been determined in the step S29. After the converted coordinates are corrected for distortion aberration using the approximated corrective distortion aberration coefficients A and B, it is determined in a step 34 whether the converted and corrected coordinates are within the non-standard image. If the converted and corrected coordinates are within the non-standard image and squarely match with the existing coordinates, the corresponding pixel value of the non-standard image is used for the composite image in a step 35. If the converted and corrected coordinates are outside of the non-standard image, the corresponding pixel value of the composite image remains. However, if the converted and corrected coordinates are within the non-standard image, but they do not squarely match with the existing coordinates, the pixel value is approximated by the surrounding pixels of the non-standard image by linear interpolation. The steps 33 through 35 are repeated for every pixel in the composite image as checked by a step 36. After all of the pixels are processed, the composite image is outputted in a step 37. In general, the above described steps 30 through 36 correctively correspond to steps 9 and 10 of FIG. 4.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of generating a composite image from a plurality of partially overlapping images, comprising the steps of:

a) taking said partially overlapping images along a plurality of optical axes of an image-forming lens, said partially overlapping images including a first image portion and a second image portion, said first image portion and said second image portion sharing at least a common pattern;

b) determining an angular relation between said first image portion and said second image portion based upon said common pattern;

b') converting first angular information of said first image portion into second angular information according to an angular system of said second image portion so as to generate unified angular information; and c) generating the composite image from said first image portion and said second image portion based upon said unified angular information.

2. The method of generating a composite image according to claim 1 wherein said step b) further comprises the steps:

d) finding a predetermined number of the common patterns in said first image portion and said second image portion;

e) determining a conversion matrix based upon said angular relation; and f) converting first angular coordinates of said common patterns in said first image portion to second angular coordinates in said second image portion based upon said conversion matrix.

3. The method of generating a composite image according to claim 2 wherein said conversion matrix converts a first position in a first space to a second position in a second space.

4. The method of generating a composite image according to claim 3 wherein said conversion matrix is expressed in a following equation:

$$(X1, Y1, Z1)^t =$$

$$\begin{bmatrix} \cos(\alpha)\cos(\beta) - \sin(\alpha)\sin(\beta)\cos(\gamma) & \cos(\alpha)\sin(\beta) + \sin(\alpha)\cos(\beta)\cos(\gamma) & -\sin(\alpha)\sin(\gamma) \\ -\sin(\alpha)\cos(\beta) - \cos(\alpha)\sin(\beta)\cos(\gamma) & -\sin(\alpha)\sin(\beta) + \cos(\alpha)\cos(\beta)\cos(\gamma) & -\cos(\alpha)\sin(\gamma) \\ \sin(\beta)\sin(\gamma) & \cos(\beta)\sin(\gamma) & \cos(\gamma) \end{bmatrix} \times$$

$$(x2, y2, z2)^T$$

where (x1, y1, z1) represents said first position, (x2, y2, z2) represents said second position, α is an angle between x1 and a common axis, β is an angle between x2 and the common axis, γ is an angle between z1 and z2.

5. The method of generating a composite image according to claim 2 wherein said step c) projects said first image portion and said second image portion onto a common display surface.

6. The method of generating a composite image according to claim 1 wherein said step b) corrects distortion aberration based upon a predetermined equation.

7. The method of generating a composite image according to claim 6 wherein said predetermined equation includes:

$$\theta' = \theta - A\theta^3 + B\theta^5.$$

8. The method of generating a composite image according to claim 1 wherein said step c) further comprises an additional step h) of determining a first pixel value of said common patterns in said first image based upon pixels values surrounding said first pixel in said second image based upon liner correction.

9. A system for generating a composite image from a plurality of partially overlapping images, comprising:
   an image input unit for taking said partially overlapping images along a plurality of optical axes of an image-forming lens, said partially overlapping images including a first image portion and a second image portion, said first image portion and said second image portion sharing at least a common pattern;
   a first processing unit connected to said image input unit for determining an angular relation between said first image portion and said second image portion based upon said common pattern and converting first angular information of said first image portion into second angular information according to an angular system of said second image portion so as to generate unified angular information; and
   a second processing unit connected to said first processing unit for generating the composite image from said first image portion and said second image portion based upon said unified angular information.

10. The system for generating a composite image according to claim 9 wherein said processing unit further comprises:
   a central processing unit running software for; and
   a memory unit connected to said central processing unit for holding the composite image generated based upon said first image portion and said second image portion.

11. The system for generating a composite image according to claim 10 further comprising a display unit connected to said central processing unit and said memory unit for displaying the composite image on a common display surface.

12. The system for generating a composite image according to claim 11 wherein said central processing unit generates the composite image by combining said first image portion and said second image portion onto said common display surface.

13. The system for generating a composite image according to claim 10 wherein said central processing unit determines said conversion matrix for converting a first position in a first space to a second position in a second space.

14. The system for generating a composite image according to claim 13 wherein said conversion matrix is expressed in a following equation:

$$(X1, Y1, Z1)^t =$$

$$\begin{bmatrix} \cos(\alpha)\cos(\beta) - \sin(\alpha)\sin(\beta)\cos(\gamma) & \cos(\alpha)\sin(\beta) + \sin(\alpha)\cos(\beta)\cos(\gamma) & -\sin(\alpha)\sin(\gamma) \\ -\sin(\alpha)\cos(\beta) - \cos(\alpha)\sin(\beta)\cos(\gamma) & -\sin(\alpha)\sin(\beta) + \cos(\alpha)\cos(\beta)\cos(\gamma) & -\cos(\alpha)\sin(\gamma) \\ \sin(\beta)\sin(\gamma) & \cos(\beta)\sin(\gamma) & \cos(\gamma) \end{bmatrix} \times$$

$$(x2, y2, z2)^T$$

where (x1, y1, z1) represents said first position, (x2, y2, z2) represents said second position, α is an angle between x1 and a common axis, β is an angle between x2 and the common axis, γ is an angle between z1 and z2.

15. The system for generating a composite image according to claim 9 wherein said processing unit corrects distortion aberration based upon a predetermined equation.

16. The system for generating a composite image according to claim 15 wherein said predetermined equation includes:

$$\theta' = \theta - A\theta^3 + B\theta^5.$$

17. The system for generating a composite image according to claim 11 wherein said central processing unit further determines a first pixel value of said common patterns in said first image based upon pixels values surrounding said first pixel in said second image based upon liner correction.

18. The system for generating a composite image according to claim 9 further comprising:
   a storage unit for storing data representing said partially overlapping images; and
   an interface unit connected to said storage unit and said processing unit for inputting said data into said processing unit.

19. An image processing device for generating a composite image, comprising:
   an image input unit for taking a plurality of partially overlapping adjacent images along a plurality of optical axes of said image input unit;

an angular position sensor connected to said image input unit for determining an angular position of said image input unit for each of the partially overlapping adjacent images;

an angular converter for converting first angular information of said first image portion into second angular information according to an angular system of said second image portion so as to generate unified angular information; and a processing unit connected to said angular converter for generating a composite image from the converted partially overlapping adjacent images based upon based upon said unified angular information.

20. The image processing device for image processing device according to claim 19 wherein said processing unit determines a conversion matrix for converting a first position in one of the partially overlapping adjacent images to a second position in another of the partially overlapping adjacent images.

21. The image processing device according to claim 20 wherein said conversion matrix is expressed in a following equation:

$$(X1, Y1, Z1)^t = \begin{bmatrix} \cos(\alpha)\cos(\beta) - \sin(\alpha)\sin(\beta)\cos(\gamma) & \cos(\alpha)\sin(\beta) + \sin(\alpha)\cos(\beta)\cos(\gamma) & -\sin(\alpha)\sin(\gamma) \\ -\sin(\alpha)\cos(\beta) - \cos(\alpha)\sin(\beta)\cos(\gamma) & -\sin(\alpha)\sin(\beta) + \cos(\alpha)\cos(\beta)\cos(\gamma) & -\cos(\alpha)\sin(\gamma) \\ \sin(\beta)\sin(\gamma) & \cos(\beta)\sin(\gamma) & \cos(\gamma) \end{bmatrix} \times (x2, y2, z2)^T$$

where (x1, y1, z1) represents said first position, (x2, y2, z2) represents said second position, α is an angle between x1 and a common axis, β is an angle between x2 and the common axis, γ is an angle between z1 and z2.

22. An article of manufacture, comprising:

computer usable storage medium for storing a computer readable program code embodied therein which provides computer instructions for generating a composite image from a first image portion and a second image portion, the computer readable program code in said article of manufacture comprising:

computer readable sample program code for causing the computer to finding a predetermined number of the common patterns in said first image portion and said second image portion;

computer readable sample program code for causing the computer to determine an angular relation based upon the common patterns; and computer readable processing program code for causing the computer to determine a conversion matrix based upon said angular relation so as to convert first angular coordinates of said common patterns in said first image portion to second angular coordinates in said second image portion based upon said conversion matrix.

23. A program storage device readable by a machine, tangibly embodying a program of instructions executable by the machine to perform method steps of generating a composite image, said method steps comprising:

a) providing partially overlapping images from a common location along a plurality of optical axes of an image-forming lens, said partially overlapping images including a first image portion and a second image portion, said first image portion and said second image portion sharing at least a common pattern;

b) determining an angular relation between said first image portion and said second image portion based upon said common pattern;

b'converting first angular information of said first image portion into second angular information according to an angular system of said second image portion so as to generate unified angular information; and c) generating the composite image from said first image portion and said second image portion based upon said unified angular information.

* * * * *